(No Model.)
D. W. MURPHY.
ANNEALING OVEN.
No. 482,048. Patented Sept. 6, 1892.
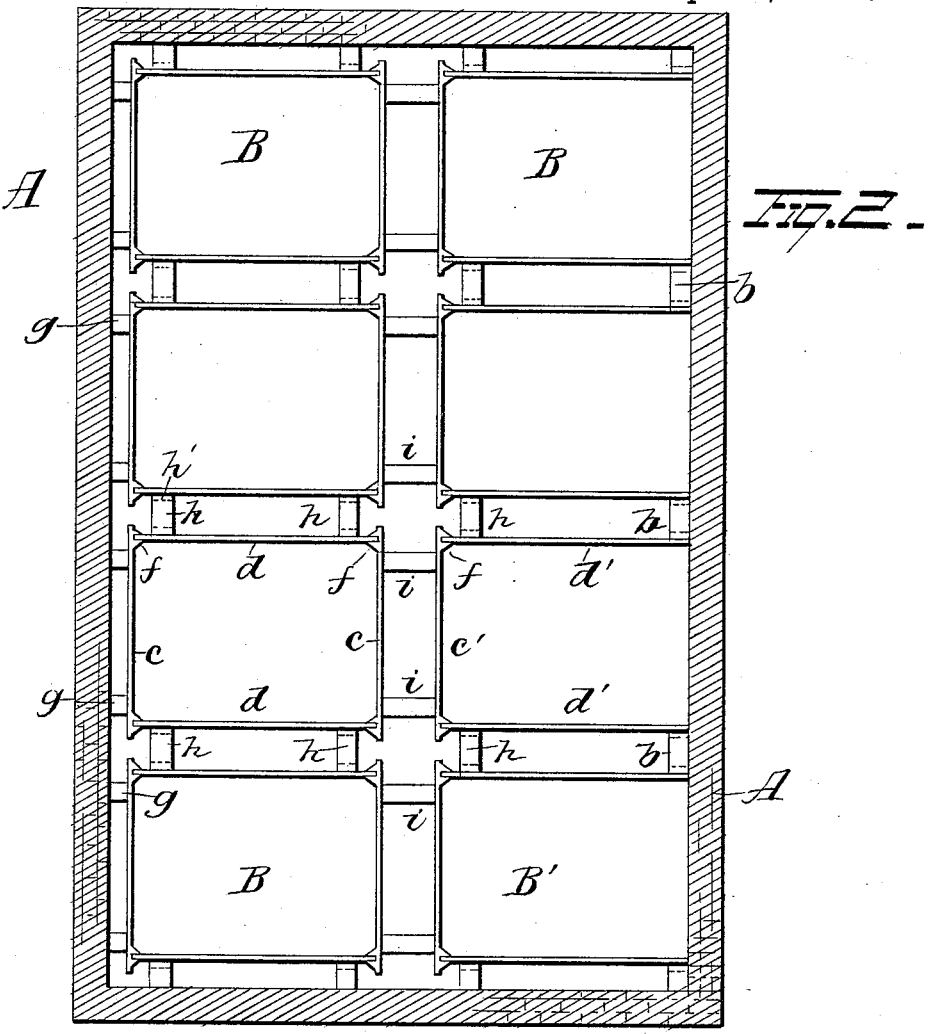
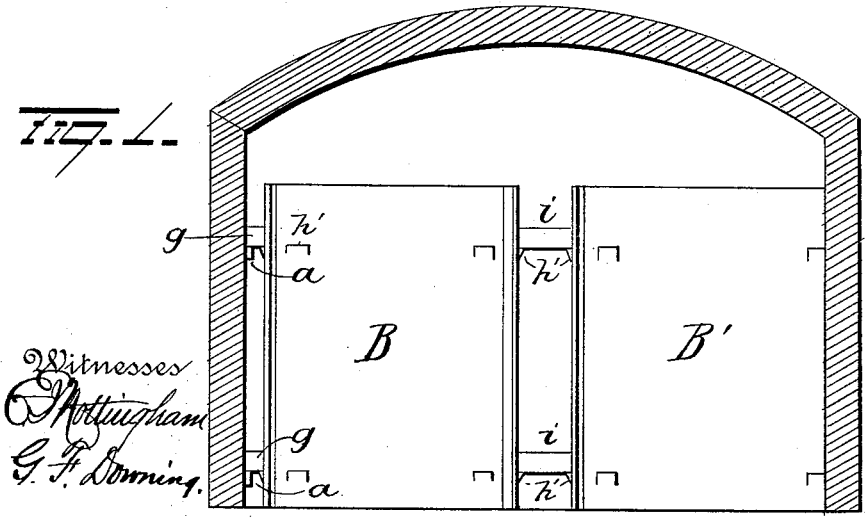
Witnesses
O. Nottingham
G. F. Downing
Inventor
D W Murphy
By Leggett & Leggett
Attorneys

UNITED STATES PATENT OFFICE.

DANIEL W. MURPHY, OF MARION, OHIO.

ANNEALING-OVEN.

SPECIFICATION forming part of Letters Patent No. 482,048, dated September 6, 1892.

Application filed April 5, 1892. Serial No. 427,838. (No model.)

*To all whom it may concern:*

Be it known that I, DANIEL W. MURPHY, of Marion, in the county of Marion and State of Ohio, have invented certain new and useful Improvements in Annealing-Ovens; and I do hereby declare the following to be a full, clear, and exact description of the invention, such as will enable others skilled in the art to which it appertains to make and use the same.

My invention relates to an improvement in annealing-ovens for annealing iron; and it consists in the parts and combination of parts, as will be more fully described, and pointed out in the claims.

In the accompanying drawings, Figure 1 is an end view of an oven, the front being removed, showing the pots therein, and Fig. 2 is a plan view with the top or arch of the oven removed.

A represents an oven, preferably rectangular in shape and of any desired size, and B B' are the pots, arranged as shown in Fig. 2. The oven is constructed to receive a series of pots transversely and also longitudinally and is provided on one side with a series of seats or stops $a$, arranged at intervals throughout the length of the oven, and on its opposite side with a series of projections $b$, preferably of brick, built into the walls of the oven, each projection $b$ being of a width equal to the distance between two pots. The pots B B' are each made of removable sides and ends and are held together by removable bricks or their equivalent, reaching from one to the other and from the sides to the wall. The pots B are each made up of two removable ends $c$ and two removable sides $d$, the ends $c$ having lips $f$, adapted to overlap the inner and outer edges of the sides $d$ and assist in holding them in place. Between the ends adjacent to the wall and the wall of the oven are placed the bricks $g$ or their equivalents, which latter rest on the seats $a$ and hold said ends a predetermined distance from the wall. The sides $d$ are also separated from each other and from the walls by bricks or equivalent devices $h$, which latter rest on seats $h'$ formed on the sides $d$ and oven-walls and support said sides. The pots B' on the opposite sides of the oven each consist simply of two sides $d'$ and one end $c'$, the side wall of the oven constituting the other ends of the entire series of pots. The side walls of the pots of this series are separated by the brick projections $b$ and by the removable bricks $h$, while the end wall of each is provided with overlapping lips similar to the end walls of pots B. The adjacent or inner ends of the two series of pots B B' are held in place by the bricks or equivalent devices $i$, which latter are supported on the seats $h'$ formed on the outer faces of the ends. By this arrangement of parts the iron to be annealed can be packed in the oven direct and the pots then assembled, and by separating the pots by means of the bricks or equivalent devices spaces for the free circulation of the fire and hot air around the pots is provided, and the whole of the interior of the oven utilized.

Any convenient form of furnace for heating the oven can be employed.

Having fully described my invention, what I claim as new, and desire to secure by Letters Patent, is—

1. An annealing-oven having a series of inwardly-projecting seats, in combination with annealing-pots, and devices resting on the seats on the oven-walls and bearing against the pots, and devices resting between the pots, substantially as set forth.

2. An annealing-oven having a series of inwardly-projecting seats, in combination with a series of sectional annealing-pots and devices resting on the seats in the oven-walls and bearing against sections of the pots, and removable devices interposed between the pots for supporting the sections thereof, substantially as set forth.

3. The combination, with an annealing-oven having a series of inwardly-projecting seats, of sectional annealing-pots formed of detachable sides and ends, said sides and ends having outwardly-projecting seats, and devices interposed between the pots and walls of the oven and between the pots, substantially as set forth,.

4. An oven, in combination with two longitudinal series of sectional annealing-pots, and removable devices interposed between the adjacent ends of the pots of the two series for holding said ends in position, substantially as set forth.

In testimony whereof I have signed this specification in the presence of two subscribing witnesses.

DANIEL W. MURPHY.

Witnesses:
 EDWARD HUBER,
 WALLACE LINDER.